United States Patent
Gossain et al.

(10) Patent No.: US 7,782,835 B2
(45) Date of Patent: Aug. 24, 2010

(54) SYSTEM AND METHOD FOR MULTIHOP PACKET FORWARDING

(75) Inventors: Hrishikesh Gossain, Apopka, FL (US);
Pankaj Aggarwal, Altamonte Springs, FL (US); Charles R. Barker, Jr., Orlando, FL (US); Keith J. Goldberg, Casselberry, FL (US); William V. Hasty, Lake Mary, FL (US); Avinash Joshi, Orlando, FL (US); Shyamal Ramachandran, Heathrow, FL (US); Surong Zeng, Schaumburg, IL (US); Heyun Zheng, Debary, FL (US); Sebnem Zorlu Ozer, North Wales, PA (US)

(73) Assignee: Motorola, Inc., Schaumburg, IL (US)

( * ) Notice: Subject to any disclaimer, the term of this patent is extended or adjusted under 35 U.S.C. 154(b) by 689 days.

(21) Appl. No.: 11/622,808

(22) Filed: Jan. 12, 2007

(65) Prior Publication Data

US 2007/0165592 A1 Jul. 19, 2007

Related U.S. Application Data

(60) Provisional application No. 60/759,357, filed on Jan. 17, 2006.

(51) Int. Cl.
*H04J 3/24* (2006.01)
*H04W 4/00* (2009.01)
(52) U.S. Cl. ............... 370/349; 370/328; 455/422.1
(58) Field of Classification Search ............ 370/310, 370/313, 315, 328, 349, 400, 401; 455/422.1
See application file for complete search history.

(56) References Cited

U.S. PATENT DOCUMENTS

| 5,446,736 | A | * | 8/1995 | Gleeson et al. | ............ 370/473 |
|---|---|---|---|---|---|
| 6,046,978 | A | | 4/2000 | Melnik | |
| 6,556,582 | B1 | | 4/2003 | Redi | |
| 7,061,925 | B2 | | 6/2006 | Joshi | |
| 2002/0052972 | A1 | * | 5/2002 | Yim | ........................ 709/245 |
| 2004/0081109 | A1 | * | 4/2004 | Oishi | ........................ 370/310 |
| 2004/0121786 | A1 | * | 6/2004 | Radcliffe et al. | ............ 455/500 |
| 2004/0240426 | A1 | | 12/2004 | Wu et al. | |
| 2006/0098611 | A1 | | 5/2006 | Joshi et al. | |
| 2008/0137580 | A1 | * | 6/2008 | Axelsson et al. | ............ 370/315 |

OTHER PUBLICATIONS

Perkins C. et al, Ad Hoc On-Demand Distance Vector (AODV) Routing, RFC 3561, Jul. 2003, 37 pages.

(Continued)

*Primary Examiner*—Pankaj Kumar
*Assistant Examiner*—Saba Tsegaye
(74) *Attorney, Agent, or Firm*—Randi L. Karpinia

(57) ABSTRACT

The present invention provides a system and method for multihop packet forwarding within a multihop wireless communication network. The method uses a data frame format including at least the four address fields to forward packets in a multihop wireless network. The method includes generating a route request packet at a routable device in response to receiving a packet destined for an unknown destination. The route request packet includes an originating device field including an address of an originating device, wherein the originating device generated the packet originally; and a source field, wherein the source field includes an address of the first routable device which generated the route request packet.

14 Claims, 4 Drawing Sheets

OTHER PUBLICATIONS

PCT/US07/060555, PCT Search Report and Written Opinion, Oct. 26, 2007, 8 pages.

PCT/US07/060555, PCT Preliminary Report on Patentability, Jul. 31, 2006, 4 pages.

Conner, Steven W., "IEEE 802.11 TGs Functional Requirements and Scope", IEEE 802.11-04/1174r13, Jan. 2005, 14 pages.

* cited by examiner

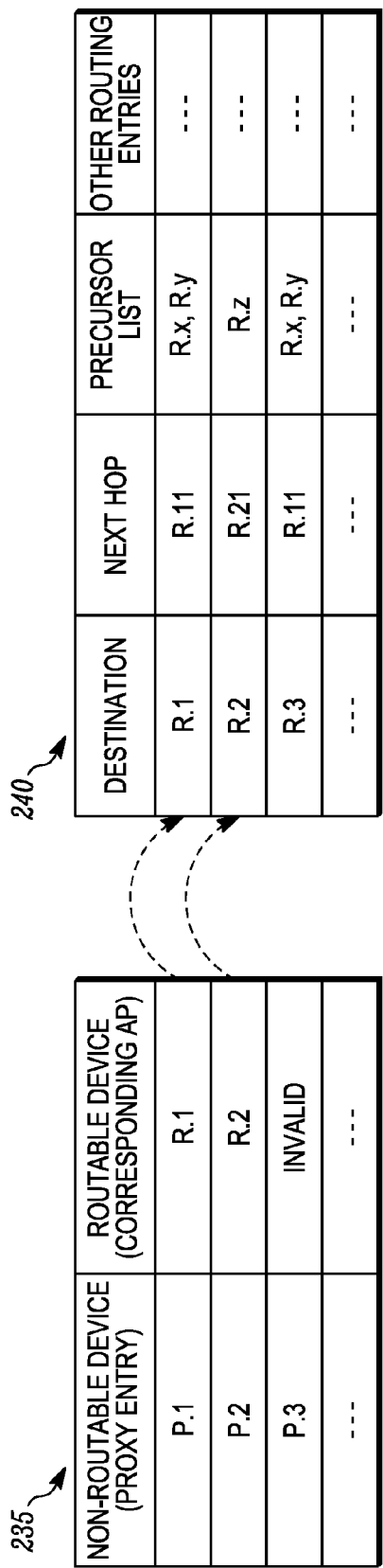
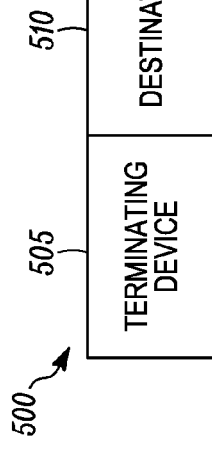
FIG. 3
FIG. 4
FIG. 5

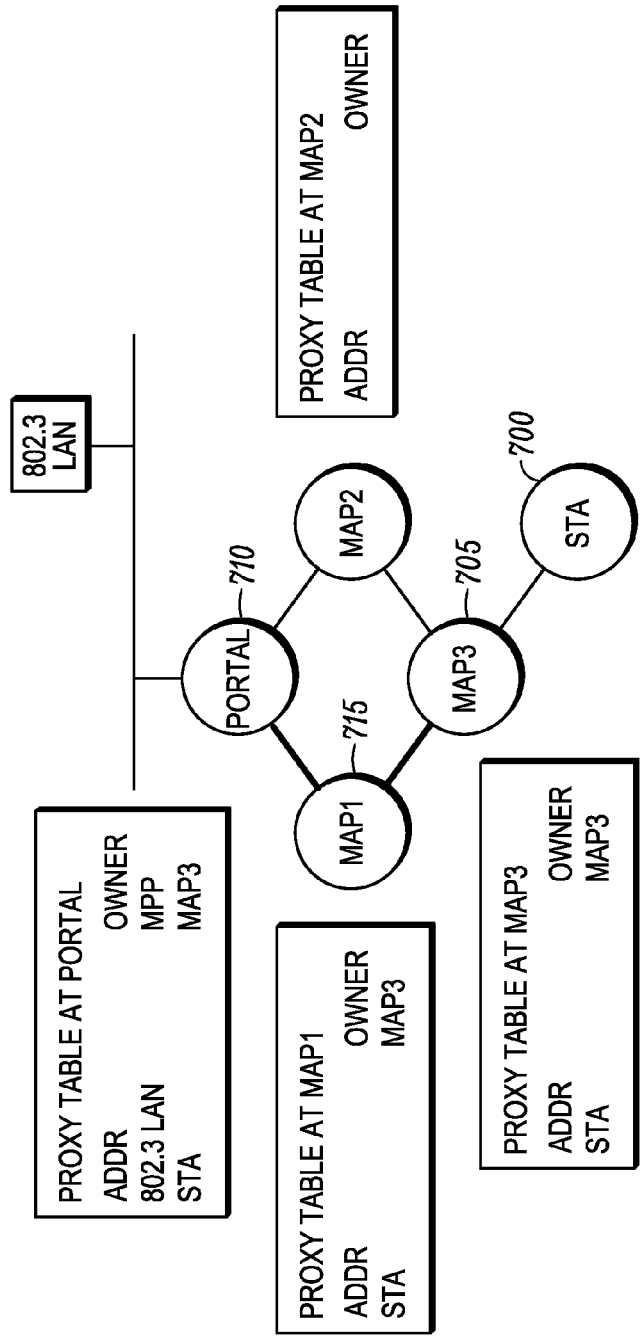

US 7,782,835 B2

SYSTEM AND METHOD FOR MULTIHOP PACKET FORWARDING

CROSS REFERENCE TO RELATED APPLICATIONS

The present application claims benefit under 35 U.S.C. §119(e) from a U.S. Provisional Patent Application of Hrishikesh Gossain, et al. entitled "System And Method For Media Access Control (MAC) Layer Multihop Packet Forwarding", Ser. No. 60/759,357, filed on Jan. 17, 2006, the entire contents being incorporated herein by reference.

FIELD OF THE INVENTION

The present invention relates generally to wireless communications and more particularly to multihop packet forwarding in a wireless network.

BACKGROUND

An infrastructure-based wireless network typically includes a communication network with fixed and wired gateways. Many infrastructure-based wireless networks employ a mobile unit or host which communicates with a fixed base station that is coupled to a wired network. The mobile unit can move geographically while it is communicating over a wireless link to the base station. When the mobile unit moves out of range of one base station, it may connect or "handover" to a new base station and starts communicating with the wired network through the new base station.

In comparison to infrastructure-based wireless networks, such as cellular networks or satellite networks, ad hoc networks are self-forming networks which can operate in the absence of any fixed infrastructure, and in some cases the ad hoc network is formed entirely of mobile nodes. An ad hoc network typically includes a number of geographically-distributed, potentially mobile units, sometimes referred to as "nodes," which are wirelessly connected to each other by one or more links (e.g., radio frequency communication channels). The nodes can communicate with each other over a wireless media without the support of an infrastructure-based or wired network. Links or connections between these nodes can change dynamically in an arbitrary manner as existing nodes move within the ad hoc network, as new nodes join or enter the ad hoc network, or as existing nodes leave or exit the ad hoc network. Because the topology of an ad hoc network can change significantly, techniques are needed which can allow the ad hoc network to dynamically adjust to these changes. Due to the lack of a central controller, many network-controlling functions can be distributed among the nodes such that the nodes can self-organize and reconfigure in response to topology changes.

One characteristic of the nodes is that each node can directly communicate over a short range with nodes which are a single "hop" away. Such nodes are sometimes referred to as "neighbor nodes." When a node transmits packets to a destination node and the nodes are separated by more than one hop (e.g., the distance between two nodes exceeds the radio transmission range of the nodes, or a physical barrier is present between the nodes), the packets can be relayed via intermediate nodes ("multi-hopping") until the packets reach the destination node. In such situations, each intermediate node routes the packets (e.g., data and control information) to the next node along the route, until the packets reach their final destination. For relaying packets to the next node, each node should maintain routing information collected through conversation with neighboring nodes. The routing information can also be periodically broadcast in the network to reflect the current network topology. Alternatively, to reduce the amount of information transmitted for maintaining accurate routing information, the network nodes may exchange routing information only when it is needed. In an approach known as Mesh Scalable Routing (MSR), nodes periodically send HELLO messages (e.g., once per second) that contain routing information and metrics associated with a route to a gateway. Mobile nodes use information extracted from the HELLO messages to decide the most efficient manner for performing handoff.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 3 illustrates an exemplary Proxy Table and Routing Table Maintained at each Routable Device in accordance with at least some embodiments of the present invention.

FIG. 4 illustrates an exemplary RREQ Packet Format in accordance with at least some embodiments of the present invention.

FIG. 5 illustrates an exemplary RREP Packet Format in accordance with at least some embodiments of the present invention.

FIG. 6 illustrates an exemplary Mesh DATA Packet Format in accordance with at least some embodiments of the present invention.

FIG. 7 illustrates an exemplary Proxy Binding Update procedure to a Portal in accordance with at least some embodiments of the present invention.

Figure 1:
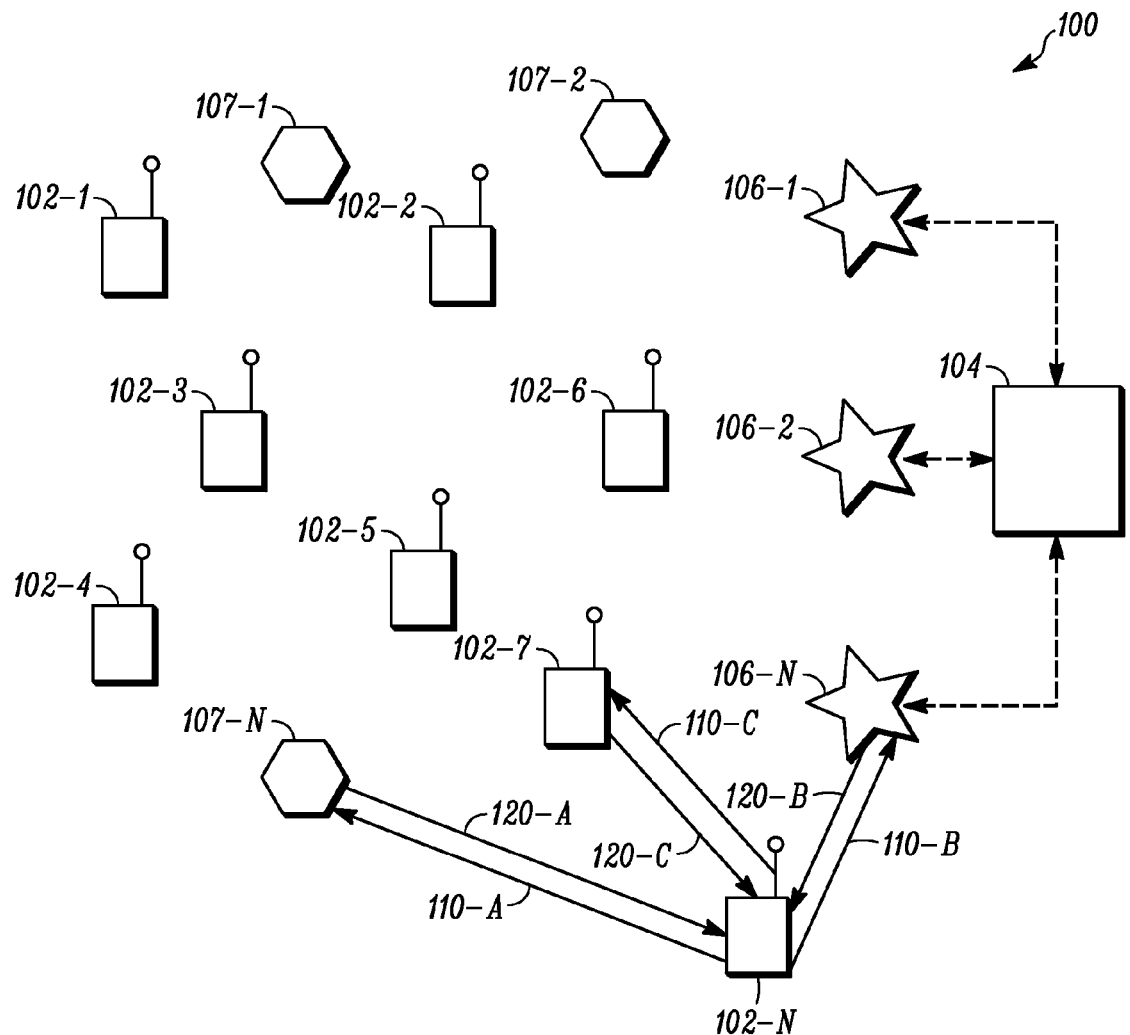
FIG. 1 is a block diagram of an exemplary communication network employing a system and method in accordance with at least some embodiments of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to media access control (MAC) layer multihop packet forwarding. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of MAC layer multihop packet forwarding described herein. The non-processor circuits may include, but are not limited to, a radio receiver, a radio transmitter, signal drivers, clock circuits, power source circuits, and user input devices. As such, these functions may be interpreted as steps of a method to perform MAC layer multihop packet forwarding. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The present invention provides a system and method to forward packets in multihop wireless networks. As an exemplary implementation, the method described herein can utilize the four address fields available in the IEEE 802.11 Data Frame type to forward packets in multihop wireless networks. The method considers both infrastructure (with Portals) and infrastructure-less (no portals) networks, and provides a unified solution to both of them. The method provided can further be built on top of Mesh Scalable Routing (MSR) which uses six addresses to forward packets in multihop wireless networks.

FIG. 1 is a block diagram illustrating an exemplary communication network 100 employing at least some embodiment of the present invention. For illustration purposes, the communication network 100 comprises an adhoc wireless communications network. For example, the adhoc wireless communications network can be a mesh enabled architecture (MEA) network or an 802.11 network (i.e. 802.11a, 802.11b, or 802.11g) It will be appreciated by those of ordinary skill in the art that the communication network 100 in accordance with the present invention can further comprise any packetized communication network. For example, the communication network 100 can further utilize packet data protocols such as TDMA (time division multiple access), GPRS (General Packet Radio Service) and EGPRS (Enhanced GPRS).

As illustrated in FIG. 1, the communication network 100 includes a plurality of mobile nodes 102-1 through 102-n (referred to generally as nodes 102 or mobile nodes 102 or mobile communication devices 102), and can, but is not required to, include a fixed network 104 having a plurality of intelligent access points (IAP) 106-1, 106-2, . . . 106-n (referred to generally as nodes 106 or access points 106), for providing nodes 102 with access to the fixed network 104. The fixed network 104 can include, for example, a core local access network (LAN), and a plurality of servers and gateway routers to provide network nodes with access to other networks, such as other ad-hoc networks, a public switched telephone network (PSTN) and the Internet. The communication network 100 further can include a plurality of fixed routers 107-1 through 107-n (referred to generally as nodes 107 or fixed routers 107 or fixed communication devices 107) for routing data packets between other nodes 102, 106 or 107. It is noted that for purposes of this discussion, the nodes discussed above can be collectively referred to as "nodes 102, 106 and 107", or simply "nodes" or alternatively as "communication devices."

As can be appreciated by one skilled in the art, the nodes 102, 106 and 107 are capable of communicating with each other directly, or via one or more other nodes 102, 106 or 107 operating as a router or routers for packets being sent between nodes. As illustrated in FIG. 1, each node communicates with other neighboring nodes using a transmitting link and a receiving link associated with the node and each of the neighboring nodes. For example, node 102-N, as illustrated, communicates with node 107-N using a transmitting link 110-A and a receiving link 120-A, communicates with node 106-N using a transmitting link 110-B and a receiving link 120-B, and communicates with node 102-7 using a transmitting link 110-C and a receiving link 120-C.

Figure 2:
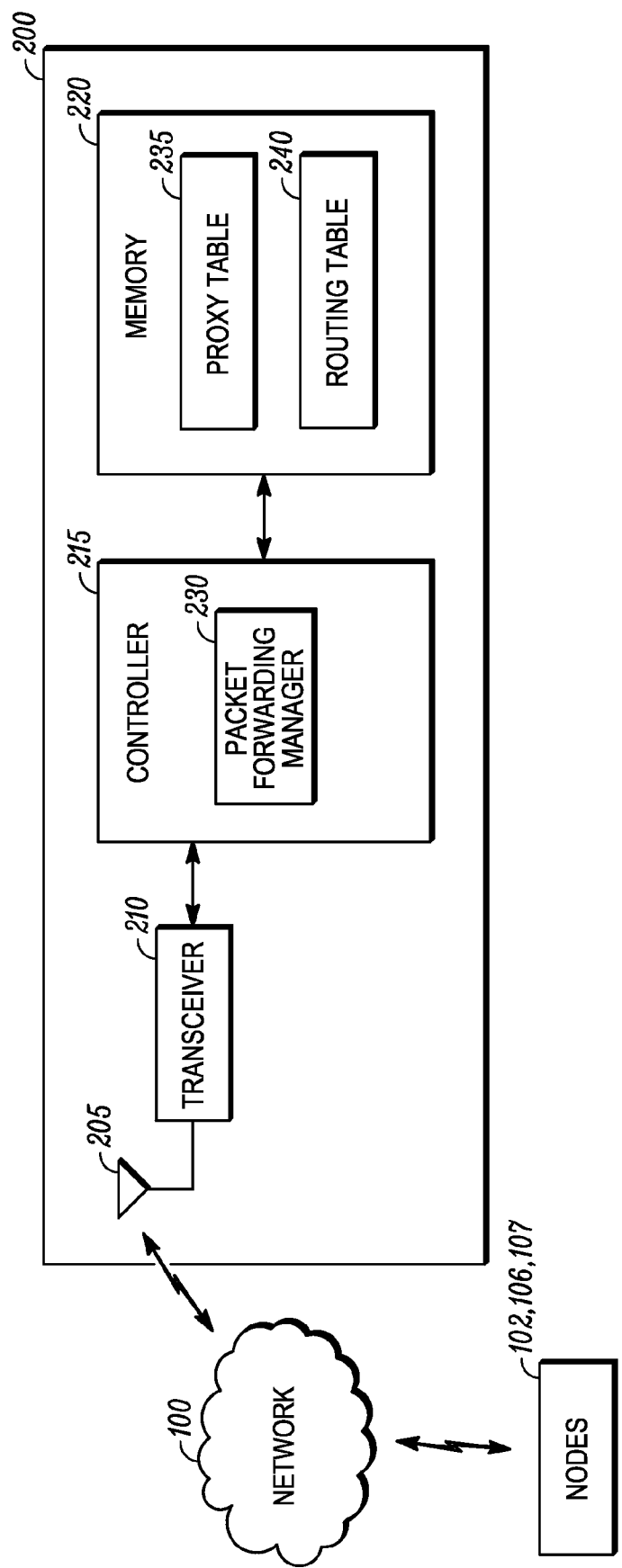
FIG. 2 is a block diagram illustrating an exemplary communication device employed in the communication network shown in FIG. 1 in accordance with at least some embodiments of the present invention.

FIG. 2 is an electronic block diagram of one embodiment of a node 200 in accordance with the present invention. The node 200, for example, can exemplify one or more of the nodes 102, 106, and 107 of FIG. 1 As illustrated, the node 200 includes an antenna 205, a transceiver (or modem) 210, a processor 215, and a memory 220.

The antenna 205 intercepts transmitted signals from one or more nodes 102, 106, 107 within the communication network 100 and transmits signals to the one or more nodes 102, 106, 107 within the communication network 100. The antenna 205 is coupled to the transceiver 210, which employs conventional demodulation techniques for receiving and transmitting communication signals, such as packetized signals, to and from the node 200 under the control of the processor 215. The packetized data signals can include, for example, voice, data or multimedia information, and packetized control signals, including node update information. When the transceiver 210 receives a command from the processor 215, the transceiver 210 sends a signal via the antenna 205 to one or more devices within the communication network 100. In an alternative embodiment (not shown), the node 200 includes a receive antenna and a receiver for receiving signals from the communication network 100 and a transmit antenna and a transmitter for transmitting signals to the communication network 100. It will be appreciated by one of ordinary skill in the art that other similar electronic block diagrams of the same or alternate type can be utilized for the node 200.

Coupled to the transceiver 210, is the processor 215 utilizing conventional signal-processing techniques for processing received messages. It will be appreciated by one of ordinary skill in the art that additional processors can be utilized as required to handle the processing requirements of the processor 215.

IEEE 802.11s recommends [802.11s Requirements] using an IEEE 802.11 MAC DATA header to forward packets in multihop wireless networks. Hence the multihop packet forwarding is done in the MAC layer itself and is transparent to higher layers which see the 802.11s mesh as a single local area network (LAN) segment. Devices which are not forwarding capable or non-routable (e.g. 802.11 stations (STAs)) are proxied by routable devices (e.g. an access point (AP) capable of routing). Typically, the routable device takes care of forwarding packets on behalf of the STA. This eliminates the need of maintaining/running any routing protocols at the end stations and provides backward compatibility with IEEE 802.11. For example, when the node 200 is a routable device, the node 200 can include a packet forwarding manager 230 as illustrated in FIG. 2 for forwarding packets on behalf of non routable stations within the network 100.

In accordance with the present invention, the processor 215 includes the packet forwarding manager 230 for managing packet forwarding within the communication network 100. It will be appreciated by those of ordinary skill in the art that the packet forwarding manager 230 can be hard coded or programmed into the node 200 during manufacturing, can be programmed over-the-air upon customer subscription, or can be a downloadable application. It will be appreciated that other programming methods can be utilized for programming the packet forwarding manager 230 into the node 200. It will be further appreciated by one of ordinary skill in the art that packet forwarding manager 230 can be hardware circuitry within the node 200. In accordance with the present invention, the packet forwarding manager 230 can be contained within the processor 215 as illustrated, or alternatively can be an individual block operatively coupled to the processor 215 (not shown).

To perform the necessary functions of the node 200, the processor 215 and/or the packet forwarding manager 230 are each coupled to the memory 220, which preferably includes a random access memory (RAM), a read-only memory (ROM), an electrically erasable programmable read-only memory (EEPROM), and flash memory. The memory 220, in accordance with the present invention, includes storage locations for the storage of a proxy table 235, and a routing table 240.

It will be appreciated by those of ordinary skill in the art that the memory 220 can be integrated within the node 200, or alternatively, can be at least partially contained within an external memory such as a memory storage device. The memory storage device, for example, can be a subscriber identification module (SIM) card. A SIM card is an electronic device typically including a microprocessor unit and a memory suitable for encapsulating within a small flexible plastic card. The SIM card additionally includes some form of interface for communicating with the node 200.

An IEEE 802.11 MAC DATA header has four address fields. Two of these fields are used to identify the immediate next hop and the node presently forwarding the packet. The remaining two addresses can be used to identify the original source and the final destination of the DATA packet. In the case where both the source and destination of the traffic are routable devices, four addresses are sufficient to forward any directed traffic. However, if a destination is a non-routable device, special care needs to taken in the routing protocol design itself, so that intermediate nodes after receiving packets know which routable device to forward the packet to. This is generally done by using a proxy table at each routable device. In the case where the destination is a non-routable device, intermediate nodes after receiving the packet use their proxy table to identify the corresponding proxied routable device, and use the routing table to identify the immediate next hop to forward the DATA packet. This is the general mechanism of forwarding packets using an IEEE 802.11 MAC header. A typical layout of the proxy table 235 and the routing table 240 maintained at each routing device such as the node 200 is illustrated in FIG. 3. Hence the maintenance of the proxy table 235 in a four address forwarding scheme is an important task. The present invention presumes the four address based MAC layer packet forwarding using proxy tables.

Protocols like Ad hoc On Demand Distance Vector (AODV) are designed to forward packets in multihop wireless networks. However these protocols are designed for the Internet Protocol (IP) layer and do not consider the address limitation of the MAC layer. One example of MAC layer packet forwarding is Mesh Scalable Routing (MSR), which uses 6 addresses to forward packets. This method is conventionally referred to as MSR6. The present invention is built on top of MSR6 and uses the same philosophy. This present invention is referred to as MSR4 herein. The present invention addresses the problems unique to a four address solution.

MSR4 Description

In MSR4 each routable device maintains two tables as shown in FIGS. 2 and 3. In addition to the routing table 240, the proxy table 235 is also maintained to identify a non-routable device and their corresponding AP (routable device). These tables can also be combined to create a single forwarding table. In the following description, the MSR4 operation in Ad Hoc mode (with no portals) is first described, followed by a description of MSR4 in the presence of portals.

MSR4 Operation in Ad Hoc Mode

RREQ Generation:

A routable device generates a Route Request (RREQ) packet when it receives a packet for an unknown destination, and the packet is originated by itself or by some non-routable device proxied by itself. A typical format of a RREQ packet 400 in accordance with the present invention is shown in FIG. 4. The RREQ packet format in the present invention, (i.e. MSR4) includes an additional Originating Device Field 405 together with a Source Field 410. The Source Field 410 of the RREQ packet 400 is set to the address of the routable device which is originating the RREQ 400. The Originating Device Field 405 includes an address set to an address of the routable device when the traffic was generated by itself. Alternatively, the Originating Device Field 405 can include an address set to an address of a non-routable device in the case where the traffic was generated by a non-routable device currently proxied by itself.

The Final Terminating Device Field 415 of the RREQ packet 400 includes an address set to the traffic destination address which may be either the address of a routable device or non-routable device.

RREQ packets can be generated with the "Destination Only" bit set to true or false. In the case where the source of the RREQ 400 knows that the terminating device is routable, it can send the RREQ packet 400 either with "Destination Only" bit true or false. However, if the source of the RREQ 400 is unaware of the type of terminating device, it sets the "Destination Only" bit to true. This avoids a RREP being sent from intermediate nodes because of old proxy entries.

Forwarding of RREQ Packets:

Intermediate nodes after receiving the RREQ packet 400, update/create reverse entry to the Source Field 410 of the RREQ 400. In addition, they compare the Originating Device Field 405 and the Source Field 410 of the RREQ packet 400. In the case where the Originating Device Field 405 address is different that Source Field 410 address, the node updates the proxy entry for the originating device to that of the source. The node then consults its proxy table 235 as well as its routing table 240 to check if it is the destination of the RREQ packet 400 or the destination is currently proxied by itself. If either of the two conditions is true, the node generates a Route Reply (RREP) packet and sends it towards the source. Otherwise, the node forwards the RREQ packet using the same mechanism as in MSR6. It will be appreciated that the above operation can be performed within the packet forwarding manager 230 of the node 200 as illustrated in FIG. 2.

RREP Generation:

A typical format of a RREP packet 500 is shown in FIG. 5. The RREP packet 500 format in MSR4 includes a Terminating Device Field 505 together with a Destination Field 510. The Destination Field 510 of the RREP packet 500 is set to the address of the routable device which is generating the RREP 500. The Terminating Device Field 505 address can be set to the address of the routable device when the traffic was destined for itself. Alternatively, the Terminating Device Field 505 address can be set to the address of a non-routable device when the traffic was destined for a non-routable device currently proxied by itself.

Intermediate nodes, after receiving the RREP packet 500, update/create a reverse entry to the Destination Field 510 of the RREP 500. In addition, they compare the Terminating Device Field 505 and the Destination Field 510 of the RREP packet 500. When the Terminating Device Field 505 address is different from the Destination Field 510 address, the intermediate nodes update the proxy entry for the terminating device to that of the destination. The intermediate node then forwards the RREP packet 500 using the same mechanism as in AODV and MSR6. It will be appreciated that the above operation can be performed within the packet forwarding manager 230 of the node 200 as illustrated in FIG. 2.

Packet Forwarding in Mesh Networks:

DATA forwarding in MSR4 is done by utilizing four addresses available in 802.11 MAC header. The format of a typical MSR4 packet 600 is illustrated in FIG. 6.

For directed traffic, the Terminating Device field 605 in the DATA packet 600 may be either a routable or non-routable device. An intermediate routable device after receiving a DATA packet 600 consults both its proxy table 235 and its routing table 240 to forward the DATA packet 600.

Broadcast packet forwarding in Mesh follows three steps:
1. A non-routable device can use the basic IEEE 802.11 packet format to forward broadcast to its access point (AP) (3 address forwarding).
2. A Mesh Point (MP) with no associated non-routable device (non-AP MPs in ad-hoc mode), can use the 802.11s Mesh Data Packet format to forward a broadcast traffic (3-address forwarding). Here both the ToDS and the FromDS bit are set to 0. MPs can also use 4-address forwarding with the 802.11s Mesh Data Packet format when they are operating in infrastructure mode, and presently have no associated non-routable device.
3. MAP with associated non-routable device uses 4 addresses to forward broadcast packet. ToDS and FromDS bit is set to 0 and 1. The fourth address of the IEEE 802.11 is set to the Basic Service Set IDentifier (BSSID) itself. MPs after receiving a broadcast packet, ignore the ToDS and FromDS bits, and checks if the Address 2 of the MAC header is the same as Address 4. If they are the same, the MPs accept the broadcast and follow a similar mechanism to forward the packet. When they are different, the broadcast is meant for BSS only.

Hence broadcast packets follow the Mesh DATA Packet format when an MP has no associated non-routable device. Otherwise broadcast packets follow the basic IEEE 802.11 packet format.

RERR Generation

The RERR generation process in MSR4 follows the same mechanism as in MSR6 and AODV to generate route error for unknown destination and for link failures.

Handoff

When a non-routable device hands off from one routable device to another, the new routable device sends a two hop proxy update to invalidate the routing entries in neighboring routing device. During the handoff, if a previous routable device receives a new packet for the same non-routable device it follows the mechanism described previously herein to generate a RERR towards the source.

MSR4 Operation in Infrastructure Mode (in presence of portals)

Infrastructure mode MSR4 is built on top of ad hoc mode operation as described previously herein and works similar to MSR6. In this section we outline the features of MSR4.

Binding Update

During the startup and during the handoff each routable device sends a binding update message to its associated portal outlining list of non-routable device presently proxied by itself. In MSR4 intermediate routable devices which are forwarding such binding update to portal also learn and update the proxy information in its local proxy table.

The mechanism of proxy update through a binding update message is illustrated in FIG. 7. As shown in FIG. 7, during the initialization phase, a STA 700 first associates with MAP3 705 by using standard IEEE 802.11 procedures. Once associated, MAP3 705 initiates a binding update procedure on behalf of STA 700 towards the portals (MPP) 710. To do so, it sends a binding update message on behalf of STA 700, to the mesh portal 710. MAP1 715 after receiving the binding update message modifies its own proxy table for STA 700 and forwards it towards mesh portal 710. MAP1 715 thereby learns that STA 700 is being proxied by MAP3 705. In a similar way, MPP may update its proxy table with new/updated entry for STA 700 with owner set to MAP3 705. The MPP then creates a binding reply message which is sent towards MAP3 705. Once MAP3 705 receives the binding confirmation for STA 700, proxy routing for STA 700 is established. A similar mechanism is used during the STA 700 handoff.

Optionally intermediate nodes may not update their proxy entry based on binding update. Instead, proxy entry is updated on-demand. For example, a status request (SREQ) packet follows the similar mechanism of the RREQ packet of including the "Originating Device" and intermediate nodes update their proxy entry based on the SREQ.

Status Request

Includes the address of Originating Device in addition to the Destination for which SREQ is request.

Status Reply

IAP includes both Originating Device and Destination in its SREP. Routing device initiating the status request uses this information to create the RREQ packet for the Destination in case the destination associated with the same IAP.

Maintaining Sequence Number

When a station gets the broadcast packet, it processes the packet as normal, and ignores the sequence number (same as the 802.11 standard).

When a mesh device gets the broadcast packet, if it detects the DA (RA) as the broadcast packet, it will treat the packet differently than other Wireless Distribution System (WDS) format packets. It will still interpret the address 2 as the TA address, but skip the address 3, and interpret the address 4 as original mesh source node, and pair this address with the sequence number (which is the group-cast sequence number maintained in the source mesh node) to eliminate the duplicate broadcast packet. When the mesh device re-broadcasts the packet, it will put the broadcast address in Address 1 field, put its own address in Address 2 field, copy the Address 3 field, sequence number field, and the Address 4 field in the received packet to the rebroadcast packet Address 3 field, sequence number field, and Address 4 field accordingly.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method for communicating within a multihop wireless communications network, the method comprising:
   at a first routable device:
      receiving a packet for a destination;
      determining that no valid route information for the destination or for a proxy of the destination is stored within the first routable device; and
      generating a route request packet comprising:
         an originating device field including an address of an originating device, wherein the originating device generated the packet originally;
         a source field, wherein the source field includes an address of the first routable device which generated the route request packet; and
         a destination only bit, wherein the destination only bit is set to true when the type of terminating device is unknown by the first routable device.

2. A method for communicating within a multihop wireless communications network as claimed in claim 1, wherein the originating device is a routable device.

3. A method for communicating within a multihop wireless communications network as claimed in claim 1, wherein the route request packet is destined for an unknown destination.

4. A method for communicating within a multihop wireless communications network as claimed in claim 1, wherein the originating device comprises the first routable device.

5. A method for communicating within a multihop wireless communications network as claimed in claim 1, wherein the originating device comprises a non routable device proxied by the first routable device.

6. A method for communicating within a multihop wireless communications network as claimed in claim 1, the method comprising:
   at a destination routable device:
      receiving the route request packet; and
      generating a route reply packet when the destination routable device comprises one of a device selected from a group comprising a terminating device of the route request and a proxy for the terminating device, wherein the route reply packet further comprises:
         a terminating device field, wherein the terminating device field includes an address of a terminating device, wherein the terminating device is the device for which the route request packet is destined; and
         a destination field, wherein the destination field includes an address of the destination routable device.

7. A method for communicating within a multihop wireless communications network as claimed in claim 6, wherein the terminating device is a routable device.

8. A method for communicating within a multihop wireless communications network as claimed in claim 6, wherein the terminating device is a non routable device.

9. A method for communicating within a multihop wireless communications network as claimed in claim 6, further comprising:
   at an intermediate node:
      receiving the route reply;
      creating a reverse entry to the destination field;
      comparing the terminating device field and the destination field of the route reply; and
      updating a proxy entry within a proxy table for the terminating device to the destination address when the terminating device field address is different from the destination field address.

10. A method for communicating within a multihop wireless communications network as claimed in claim 1, further comprising:
    at an intermediate node:
       receiving the route request packet.

11. A method for communicating within a multihop wireless communications network as claimed in claim 10, further comprising:
    at the intermediate node:
       creating a reverse entry to the source field of the route request packet.

12. A method for communicating within a multihop wireless communications network as claimed in claim 10, further comprising:
    at the intermediate node:
       comparing the originating device field and the source field of the route request packet; and
       updating a proxy entry for the originating device to the address within the source field when the originating device field is different from the source field.

13. A method for communicating within a multihop wireless communications network as claimed in claim 10, further comprising:
    at the intermediate node:
       generating a route reply to the first routable device, wherein the route reply comprises:
          a destination field, wherein the destination field includes an address of the intermediate node; and
          a terminating device field, wherein the terminating device field includes a destination address of a destination device of the packet, wherein the destination device is a routable device.

14. A method for communicating within a multihop wireless communications network as claimed in claim 10, further comprising:
    at the intermediate node:
       searching the terminating device address of a received packet in a local proxy table of the intermediate node;
       identifying the destination routable device to which the terminating device is proxied; and
       forwarding the packet to a next hop towards the destination device by using a routing table of the intermediate node.

* * * * *